Jan. 27, 1953     R. Q. ARMINGTON     2,626,469
CONVEYER BELT PROTECTIVE DEVICE
Filed Feb. 12, 1949

INVENTOR.
RAYMOND Q. ARMINGTON
BY
Hyde, Meyer, Baldwin & Doran
ATTORNEYS

Patented Jan. 27, 1953

2,626,469

UNITED STATES PATENT OFFICE 2,626,469

CONVEYER BELT PROTECTIVE DEVICE

Raymond Q. Armington, Shaker Heights, Ohio, assignor to The Euclid Road Machinery Co., Cleveland, Ohio, a corporation of Ohio Application February 12, 1949, Serial No. 76,138

1 Claim. (Cl. 37—108)

This invention relates to improvements in a conveyor belt protective device, and more particularly to a device for protecting the belt where it passes around a tail pulley in the zone where the belt is loaded.

One of the objects of the present invention is to protect the belt in front of the tail pulley to keep rocks, sharp stones and similar material from crushing against the belt at the face of the pulley so as to cut it.

Another object of the present invention is to protect the belt at the tail pulley as described in the preceding paragraph while at the same time providing a clearance between the shielding device and the conveyor belt so as to prevent tearing of the belt.

Another object of the present invention is to provide a belt protective device as mentioned in the preceding paragraphs while maintaining a small clearance between the protective shield and the face of the belt so that there is insufficient room for large foreign matter, coasting down the belt, to wedge between the protective shield and the belt.

Other objects and advantages of the present invention will be apparent from the accompanying drawings and specification and the essential features will be set forth in the appended claim.

In the drawings,

Fig. 2 is a transverse sectional view of the same, somewhat enlarged, taken along the line 2—2 of Fig. 3; while

Figure 1:
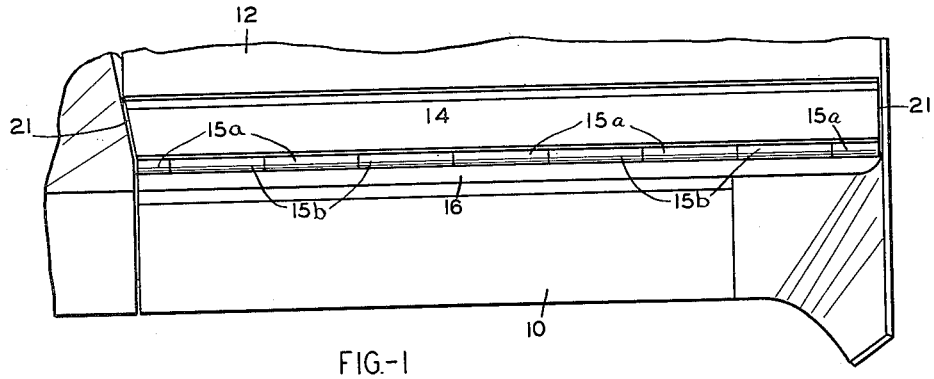
Fig. 1 is a top plan view of one embodiment of my improved belt protecting device.

While my invention has many uses in industry, I have chosen to show the same as applied to a device for digging and loading dirt or similar material using apparatus of the general character disclosed in United States patent application Serial No. 593,412, filed May 12, 1945, by myself and George E. Armington, to which reference may be had for a more complete description of this type of device. It is sufficient to state here that in a device of this character, the general apparatus is drawn by power through the material which is intended to be dug and loaded. During this movement of the apparatus, a cutting blade 10 mounted on the frame of the vehicle 11, cuts or digs into the material which is intended to be loaded upon the belt. This material rides upwardly on the inclined cutter blade, moving upwardly and toward the right as viewed in Fig. 2, to fall upon a belt 12 which moves in the direction of the arrow of Fig. 2 about a tail pulley 13. Since rocks and sharp stones and other sharp materials are often met with in this type of work, it is important that these materials should be prevented from crushing against the belt in front of or at the left hand side of the tail pulley 13 as viewed in Fig. 2. Unless prevented, these materials can bruise and cut the belt at this point. Furthermore, it is desirable to decrease the loading resistance by pushing the material up the inclined blade 10 and onto the belt 12 as nearly in a straight line as possible.

To prevent damage to the belt at the tail pulley, as described in the preceding paragraph, I have provided a protective shield 14 extending substantially the full width of the conveyor belt and having a hinge connection 15 with a mold board 16 which in turn is mounted on the frame 11. In the present form, the hinge 15 is of the piano hinge type having a pivotal axis generally parallel to the axis of the tail pulley 13. The hinge eyes 15a are rigid with, or formed integrally with, the shield 14. The intermediate hinge eyes 15b are formed integrally with, or welded to, the mold board 16. A removable hinge pin 17 is then passed through the hinge eyes 15a and 15b as shown in Figs. 2 and 3 to hold the hinge in assembled relationship.

It is important that the shield 14 should not ride upon the belt 12. This is necessary because, oftentimes, the belt becomes torn, or loose belt clips occur, and these will catch on anything which is close to the belt and tear long pieces out of the belt. The protective shield 14 of the present invention is permitted to move freely away from the belt so as to allow any obstacles to pass underneath.

It is also necessary to maintain the clearance between the protective shield and the conveyor belt at a very small figure since the belt can coast backwards whenever it is stopped. If a large gap were allowed, and the belt coasted backward, dirt and rocks would lodge in the gap. The present invention provides a very small gap so that there is insufficient room for large particles of foreign matter to wedge there.

Figure 2:
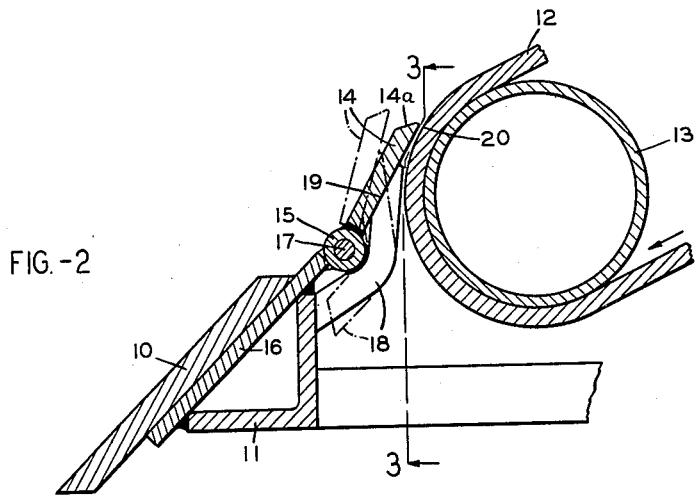
Figure 3:
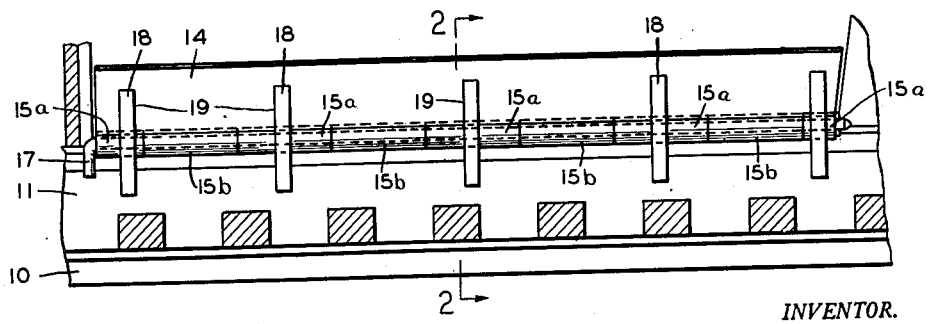
Fig. 3 is a fragmental view taken along the line 3—3 of Fig. 2, to the same scale as Fig. 1.

Referring to Figs. 2 and 3, stop means is provided for limiting the clearance between the shield and the belt in a positive manner, while permitting the shield to move freely upwardly away from the belt. To this end, a plurality of stop members 18 are secured to the under face of the protective shield 14, as by welding at the zone 19 (Fig. 2), and the opposite end of each stop member engages against the frame member 11. It will be noted from Figs. 2 and 3, that each of these stop members is in the form of a relatively narrow bar which is welded to one of the hinge eyes 15a as well as being secured to the protective shield at the zone 19. Each of these bars is bent around the hinge 15 so as to abut the vertical leg of the structural angle forming part of the frame 11. It is obvious that this construction permits the shield 14 to oscillate from its normal full line position of Fig. 2 to the dot-dash position shown there in order to permit obstacles to pass beneath the shield. It is also obvious, from Fig. 2, that the shield 14 cannot touch the belt 12 but is limited to the full line position of Fig. 2 by the abutment of the lower end of each stop member 18 against the frame member 11. In practice, the clearance at the point 20 between the edge of the shield 14 and the belt 12 is maintained at about ¼ inch. This prevents any sizeable particles of rock or dirt wedging at this point in case the belt coasts backwards. It will be noted in Fig. 2 that the upper edge 14a of the protective shield has been beveled so that rock and dirt coming down the belt 12 may more easily slide away and down the inclined shield rather than tending to wedge in front of the upper edge of the shield and against the belt.

Referring to Fig. 3, it will be noted that the stop bars 18 are spaced a considerable distance apart and there is thus plenty of room beneath the shield and between the hinge 15 and belt 12 for clearance of material which might otherwise become caught in this space.

Associated with the protective shield of this invention are wipers at the zones 21 to prevent dirt and foreign particles wedging between the ends of the shield 14 and the side boards of the conveyor. These wipers are strips of flexible material, such as rubber or leather, extending parallel to the side edges of the conveyor and lapping over upon the top of the conveyor at the lower end of the belt and along the sides of the belt at the ends of the shield 14. These flexible wiper strips are firmly held to the side boards of the conveyor and flexibly overlap on top of the conveyor so that the lower end of the conveyor is completely sealed against the entrance of dirt.

What I claim is:

In apparatus including an impervious conveyor belt passing about a tail pulley with an upper load-carrying run of said belt inclined upwardly and away from said pulley and with a mold board for guiding material onto said run at said pulley location, the combination of a shield plate generally in extension of said mold board and extending substantially entirely across the width of said belt, a pivotal mounting for said plate on said mold board parallel to the axis of said pulley and spaced from said belt, said plate having a free edge extending crosswise of said belt, said edge of said plate being free to oscillate about said pivotal mounting away from said belt, and stop means limiting oscillation of said plate toward said belt to a position where said plate is substantially tangent to said belt where it passes around said pulley and said free edge is adjacent but not touching said belt, said plate and mold board lying entirely below the plane of said load-carrying run, whereby said belt and plate and mold board forms a generally smooth continuous path substantially the full width of said belt.

RAYMOND Q. ARMINGTON.

REFERENCES CITED

The following references are of record in the file of this patent:

UNITED STATES PATENTS

| Number | Name | Date |
|---|---|---|
| 374,690 | Michelsen | Dec. 13, 1887 |
| 641,803 | Shirreffs | Jan. 23, 1900 |
| 1,238,592 | Stolzenburg | Aug. 28, 1917 |
| 1,646,452 | Gronke | Oct. 25, 1927 |
| 1,713,952 | Darr | May 21, 1929 |
| 2,306,943 | Glase | Dec. 29, 1942 |